United States Patent
Weizman et al.

(10) Patent No.: US 9,351,330 B2
(45) Date of Patent: May 24, 2016

(54) APPARATUS, SYSTEM AND METHOD OF BLUETOOTH COMMUNICATION

(71) Applicant: Intel IP Corporation, Santa Clara, CA (US)

(72) Inventors: Raz Weizman, Ra'anana (IL); Eddy Kvetny, Rishon-Lezion (IL)

(73) Assignee: INTEL IP CORPORATION, Santa Clara, CA (US)

(*) Notice: Subject to any disclaimer, the term of this patent is extended or adjusted under 35 U.S.C. 154(b) by 175 days.

(21) Appl. No.: 14/102,643

(22) Filed: Dec. 11, 2013

(65) Prior Publication Data

US 2015/0163846 A1 Jun. 11, 2015

(51) Int. Cl.
| | |
|---|---|
| *H04B 7/00* | (2006.01) |
| *H04W 24/00* | (2009.01) |
| *H04W 76/04* | (2009.01) |
| *H04W 4/00* | (2009.01) |
| *H04W 52/02* | (2009.01) |

(52) U.S. Cl.
CPC ............ *H04W 76/043* (2013.01); *H04W 4/008* (2013.01); *H04W 52/0225* (2013.01); *H04W 76/045* (2013.01)

(58) Field of Classification Search
USPC .............................................. 455/41.2, 456.1
See application file for complete search history.

(56) References Cited

U.S. PATENT DOCUMENTS

| | | | | |
|---|---|---|---|---|
| 8,000,721 | B2 * | 8/2011 | Hanner ...................... | 455/456.1 |
| 2012/0020248 | A1 * | 1/2012 | Granlund et al. ............ | 370/254 |
| 2013/0078923 | A1 * | 3/2013 | Ekbatani et al. ............ | 455/41.2 |

OTHER PUBLICATIONS

Specification of the Bluetooth System, Wireless connections made easy, Version 1.2, Nov. 5, 2003, 1200 pages.
Specification of the Bluetooth System, Experience more, Version 4.0, Jun. 30, 2010, 2302 pages.

* cited by examiner

*Primary Examiner* — Blane J Jackson
(74) *Attorney, Agent, or Firm* — Shichrur & Co.

(57) ABSTRACT

Some demonstrative embodiments include apparatuses, systems and/or methods of Bluetooth communication. For example, an apparatus may include a wireless communication unit to receive at a first Bluetooth device an indication message from a second Bluetooth device, the indication message including a state indication to indicate a non-movement state or a movement state of the second Bluetooth device, the wireless communication unit to transmit to the second Bluetooth device an update message including at least one value to indicate a rate of exchanging messages between the first and second Bluetooth devices, the rate being based on the state indication.

25 Claims, 6 Drawing Sheets

APPARATUS, SYSTEM AND METHOD OF BLUETOOTH COMMUNICATION

TECHNICAL FIELD

Embodiments described herein generally relate to Bluetooth communication.

BACKGROUND

Bluetooth (BT) Low Energy (BLE) technology provides connectivity between BT mobile devices and a variety of systems, e.g., cars, exercise devices, computers, tablets and the like.

The BLE technology supports a relatively low power consumption of the BT mobile devices. For example, a BT mobile device may be a small sensor, a watch, or a Smartphone having a battery with limited power supply, and the BLE technology may enable the BT mobile device to communicate with the variety of systems using a relatively low power consumption.

According to the BLE technology, a first BT device ("BT central device") and a second BT device ("BT peripheral device") may establish a connection between the BT peripheral device and the BT central device, to enable exchanging data between the BT peripheral device and the BT central device.

Exchanging the data between the BT peripheral device and the BT central device at a relatively high rate may increase power consumption of the BT mobile device, and may decrease a battery life of a battery of the BT mobile device.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
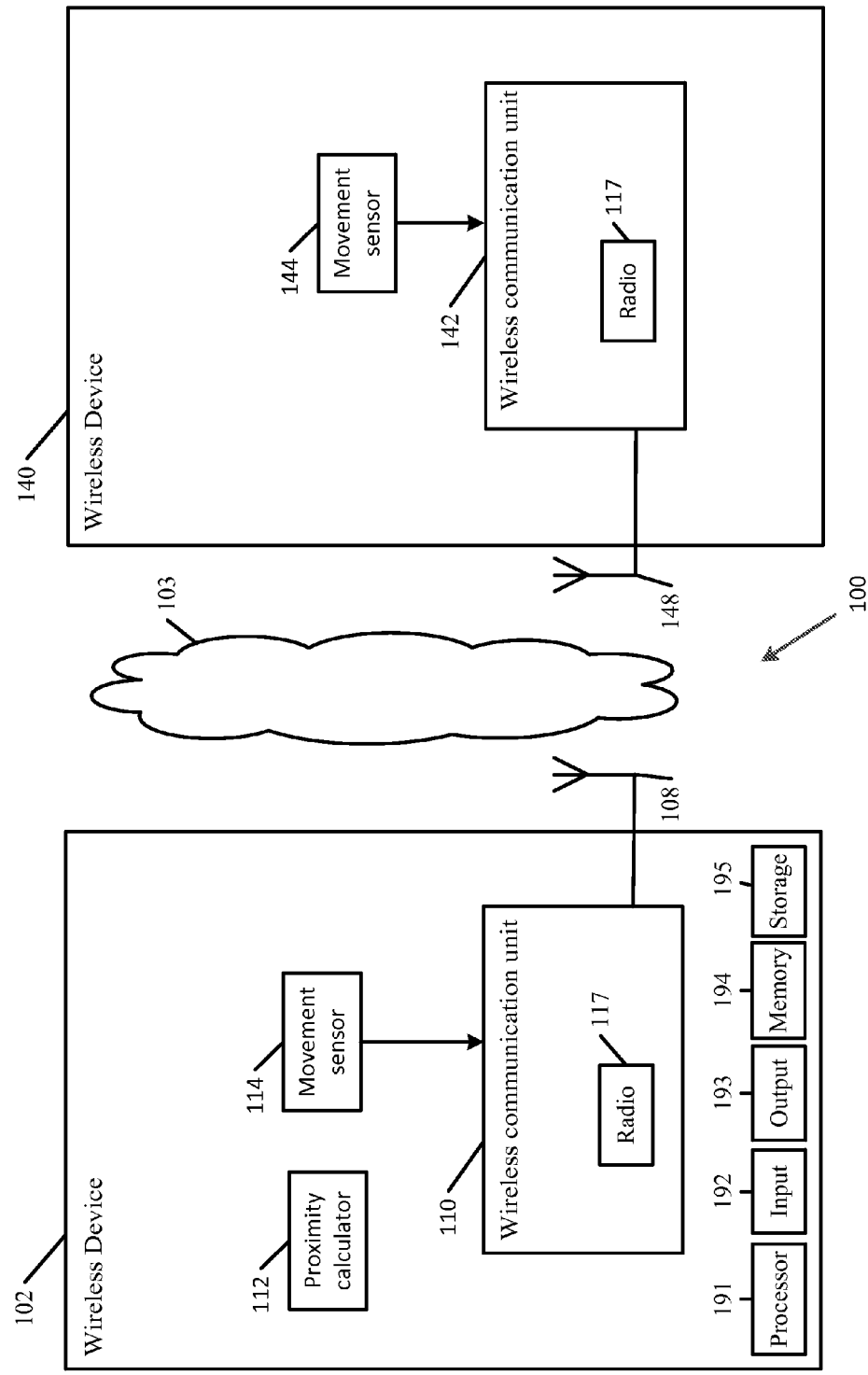
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a sensor device, a Bluetooth device, a Bluetooth Low Energy (BLE) device, an Ultrabook™, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Bluetooth standards ("the Bluetooth standards"), e.g., including *Bluetooth specification V* 1.0, Dec. 1, 1991, *Bluetooth specification V* 4.0, Jun. 30, 2010, and/or future versions and/or derivatives thereof, devices and/or networks operating in accordance with existing IEEE 802.11 standards (IEEE 802.11-2012, *IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications*, Mar. 29, 2012; IEEE802.11 *task group ac* (*TGac*) ("IEEE802.11-09/0308r12 —*TGac Channel Model Addendum Document*"); *IEEE* 802.11 *task group ad* (*TGad*) (*IEEE P*802.11*ad*-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec., 2012)) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, a Bluetooth device, a BLE device, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with a WLAN. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via a wireless medium (WM) 103. For example, system 100 may include a wireless communication device 102 and a wireless communication device 140.

In some demonstrative embodiments, WM 103 may include a Bluetooth (BT) communication channel.

In some demonstrative embodiments, system 100 may include one or more BT devices capable of communicating wireless communication signals over the BT communication channel. For example, device 102 may perform the functionality of a first BT device, and/or device 140 may perform the functionality of a second BT device.

In some demonstrative embodiments, system 100 may include one or more Bluetooth Low Energy (BLE) devices capable of communicating wireless communication signals according to a BLE communication scheme. For example, device 102 may perform the functionality of a BLE central device, and/or device 140 may perform the functionality of a BLE peripheral device.

In other embodiments, devices 102 and/or 140 may communicate wireless communication signals over the BT communication channel according to any other BT communication scheme.

In some demonstrative embodiments, devices 102 and/or 140 may include, for example, a User Equipment (UE), a mobile computer, a laptop computer, a notebook computer, a tablet computer, an Ultrabook™ computer, a mobile internet device, a handheld computer, a handheld device, a Smartphone, a sensor, a watch, a wristwatch, a wrist device, a PDA device, a handheld PDA device, a portable device, a mobile phone, a cellular telephone, a PCS device, a mobile or portable GPS device, a vehicular device or the like.

In some demonstrative embodiments, device 102 and/or device 140 may include one or more wireless communication units to perform wireless communication between device 102, device 140 and/or one or more other wireless communication devices. For example, device 102 may include a BT wireless communication unit 110, and/or device 140 may include a BT wireless communication unit 142 to perform BT wireless communication over the BT channel, e.g., as described below.

In some demonstrative embodiments, wireless communication units 110 and/or 142 may include one or more radios 117, e.g., including one or more wireless transmitters, receivers and/or transceivers able to send and/or receive wireless communication signals, RF signals, frames, blocks, transmission streams, packets, messages, data items, and/or data. In one example, the radios may include modulation elements, demodulation elements, amplifiers, analog to digital and digital to analog converters, filters, and/or the like. For example, wireless communication units 110 and/or 142 may include or may be implemented as part of a wireless Network Interface Card (NIC), and the like.

In some demonstrative embodiments, the wireless communication units may include, or may be associated with, one or more antennas. For example, wireless communicate unit 110 may be associated with one or more antennas 108 and/or wireless communicate unit 142 may be associated with one or more antennas 148.

Antennas 108 and/or 148 may include any type of antennas suitable for transmitting and/or receiving wireless communication signals, blocks, frames, transmission streams, packets, messages and/or data. For example, antennas 108 and/or 148 may include any suitable configuration, structure and/or arrangement of one or more antenna elements, components, units, assemblies and/or arrays. Antennas 108 and/or 148 may include, for example, antennas suitable for directional communication, e.g., using beamforming techniques. For example, antennas 108 and/or 148 may include a phased array antenna, a multiple element antenna, a set of switched beam antennas, and/or the like. In some embodiments, antennas 108 and/or 148 may implement transmit and receive functionalities using separate transmit and receive antenna elements. In some embodiments, antennas 108 and/or 148 may implement transmit and receive functionalities using common and/or integrated transmit/receive elements.

In some demonstrative embodiments, devices 102 and/or 140 may also include, for example, a processor 191, an input unit 192, an output unit 193, a memory unit 194, and a storage unit 195. Mobile device 102 and/or device 140 may optionally include other suitable hardware components and/or software components. In some demonstrative embodiments, some or all of the components of mobile device 102 and/or device 140 may be enclosed in a common housing or packaging, and may be interconnected or operably associated using one or more wired or wireless links. In other embodiments, components of mobile device 102 may be distributed among multiple or separate devices.

Processor 191 include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 191 executes instructions, for example, of an Operating System (OS) of mobile device 102 and/or of one or more suitable applications.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 include, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by mobile device 102.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

In some demonstrative embodiments, device 102 and device 140 may establish a connection over WM 103, e.g., according to the BLE communication scheme or any other BT protocol.

In some demonstrative embodiments, device 102 and device 140 may perform one or more proximity measurements between devices 102 and 140 to determine proximity between devices 102 and 140.

In one example, device 102 may include a wireless display docking station and device 140 may include a Smartphone. The wireless display may display content, data, images and/or video from the Smartphone, for example, when a distance between the Smartphone and the display is lesser than a predefined distance, e.g., less than 3 meters. Accordingly, devices 102 and 140 may perform the proximity measurements to determine, for example, if the distance between devices 102 and 140 is lesser than the predefined distance, e.g., to enable the display, for example, to display video from the Smartphone.

In another example, device 102 may include an alerting wristwatch to be worn by a child and device 140 may include a Smartphone to be used by a parent of the child. The Smartphone may sound an alarm, for example, when a distance between the Smartphone and the child is greater than a predefined distance, e.g., greater than 20 meters, for example, to indicate the child moving away from the parent. Accordingly, devices 102 and 140 may perform the proximity measurements to determine, for example, if the distance between devices 102 and 140 is greater than the predefined distance, e.g., to sound the alarm at the Smartphone.

In some demonstrative embodiments, device 102 may include a proximity calculator 112 configured to determine proximity between device 102 and one or more other devices, e.g., device 140.

In some demonstrative embodiments, proximity calculator 112 may be implemented as part of wireless communication unit 110. In other embodiments, proximity calculator 112 may be implemented as another element of device 102.

In some demonstrative embodiments, proximity calculator 112 may determine the proximity between devices 102 and 140, based on one or more messages ("the proximity messages") exchanged between devices 102 and 140, e.g., as described below.

In some demonstrative embodiments, device 102 may transmit a first message to device 140.

In some demonstrative embodiments, device 140 may receive the first message and may transmit to device 102*a* second message, e.g., in response to the first message.

In some demonstrative embodiments, the first and the second messages may include attribute protocol (ATT) messages. For example, the first message may include an ATT read request message, and/or the second message may include an ATT read response message.

In some demonstrative embodiments, proximity calculator 112 may determine the proximity between devices 102 and 140 based on the read request message and the read response message, e.g., as described below.

In some demonstrative embodiments, wireless communication unit 110 may measure a received signal strength (RSSI) of the read response message, for example, when received by wireless communication unit 110, e.g., via antennas 108.

In some demonstrative embodiments, proximity calculator 112 may determine proximity between devices 102 and 140 based on the RSSI of the read response message. For example, proximity calculator 112 may determine a power loss of the signal strength of the read response message, for example, by comparing a signal strength indication of a transmitted power of the read response message, e.g., as transmitted by wireless communication unit 142, and the RSSI of the read response message, as received at device 102. Proximity calculator 112 may determine the proximity between devices 102 and 140, for example, based on the power loss and a predefined power loss per distance.

In some demonstrative embodiments, wireless communication units 110 and 142 may exchange a relatively large number of proximity messages, for example, to perform a relatively large number of proximity measurements.

In some demonstrative embodiments, proximity calculator 112 may perform the large number of proximity measurements, for example, to increase an accuracy of a determined proximity between devices 102 and 140 and/or to track changes in the proximity along time.

In some demonstrative embodiments, exchanging the relatively large number of the proximity messages may increase a power consumption of device 102 and/or device 140, for example, which may be required for handling the exchanges of the proximity messages.

Some demonstrative embodiments may enable reducing a number of exchanges of the proximity messages, for example, without affecting the accuracy of the determined proximity, e.g., as described below.

Some demonstrative embodiments may enable reducing the number of exchanges of proximity messages based on the motion of device 102 and/or device 140, e.g., as described below.

For example, wireless communication unit 110 and 142 may exchange a reduced number of proximity messages, e.g., if both devices 102 and 140 are static.

Some demonstrative embodiments may enable significantly reducing the power consumption of devices 102 and/or 140, e.g., when devices 102 and 104 are static for long periods of time.

In some demonstrative embodiments, device 102 may determine a rate of exchanging the proximity messages between devices 102 and 140 based on the movement of device 102 and/or device 140, e.g., as described below.

In some demonstrative embodiments, device 102 may dynamically adjust the rate of exchanging the proximity messages between devices 102 and 140 based on the movement of device 102 and/or device 140, e.g., as described below.

In some demonstrative embodiments, device 102 may include a movement sensor 114 to sense movement of device 102.

In some demonstrative embodiments, device 140 may include a movement sensor 144 to sense movement of device 140.

In some demonstrative embodiments, movement sensors 114 and/or 144 may include an orientation sensor, an accelerometer, a gyroscope, a GPS receiver, and or any other sensor to detect a movement of a mobile device.

In some demonstrative embodiments, movement sensor 114 may determine a motion state of device 102. For example, the motion state of device 102 may include a non-movement state or a movement state.

In one example, movement sensor 114 may determine the non-movement state of device 102, for example, if device 102 is static or if device 102 moves at a relatively slow speed, e.g., lesser than a predefined speed threshold.

In another example, movement sensor 114 may determine the movement state of device 102, for example, if device 102 is moving at a speed, e.g., greater than the predefined speed threshold.

In some demonstrative embodiments, movement sensor 114 may indicate to wireless communication unit 112 the motion state of device 102, for example, upon a change in the motion state of device 102, e.g., from the non-movement state to the movement state and vice versa.

In some demonstrative embodiments, movement sensor 144 may determine a motion state of device 140. For example, the motion state of device 140 may include a non-movement state or a movement state.

In one example, movement sensor 144 may determine the non-movement state of device 140, for example, if device 140 is static, or if device 140 is moving at a relatively slow speed, e.g., lesser than a predefined speed threshold.

In another example, movement sensor 144 may determine the movement state of device 140, for example, if device 140 is moving at a speed, e.g., greater than the predefined speed threshold.

In some demonstrative embodiments, movement sensor 144 may indicate to wireless communication unit 142 the motion state of device 140, for example, upon a change in the motion state of device 140, e.g., from the non-movement state to the movement state and vice versa.

In some demonstrative embodiments, wireless communication unit 110 may determine the rate of exchanging the proximity messages between devices 140 and 102 based on the movements of devices 140 and 102, e.g., as indicated by motions sensors 114 and/or 144.

In some demonstrative embodiments, wireless communication unit 110 may determine a first rate of exchanging the proximity messages, for example, if both devices 102 and 140 are at the non-movement state.

In some demonstrative embodiments, a relatively reduced rate may enable determining a relatively accurate proximity between devices 102 and 140, for example, if both devices 102 and/or 140 are static, e.g., since the proximity between devices 102 and 140 may not change over a relatively long period of time. Accordingly, the first rate may include a relatively reduced rate, e.g., a rate of two or less exchanges of the proximity messages per second or any other rate.

In some demonstrative embodiments, wireless communication unit 110 may determine a second rate of exchanging the proximity messages between devices 140 and 102, for example, if at least one of devices 102 and 140 is at the movement state.

In some demonstrative embodiments, a relatively increased rate may enable determining a relatively accurate proximity between devices 102 and 140, for example, if at least one of devices 102 and/or 140 is moving, e.g., since the proximity between devices 102 and 140 may change within a relatively short period of time. Accordingly, the second rate may include a relatively increased rate, e.g., a rate of thirty or more exchanges of the proximity messages per second or any other rate.

In some demonstrative embodiments, wireless communication unit 142 may transmit to device 102 information relating to the motion state of device 140, and wireless communication unit 110 may transmit to device 140 information relating to the rate of exchanging the proximity messages, for example, based on the motion state of device 140, e.g., as described below.

In some demonstrative embodiments, wireless communication unit 110 may receive an indication message from device 140 including a state indication to indicate the non-movement state or the movement state of device 140, e.g., as determined by movement sensor 144.

In some demonstrative embodiments, wireless communication unit 110 may transmit to device 140 an update message including at least one value to indicate the rate of exchanging the proximity messages between devices 102 and 140.

In some demonstrative embodiments, the rate of exchanging the proximity messages between devices 102 and 140 may be based on the state indication of device 140 and/or device 102.

In some demonstrative embodiments, the rate of exchanging the proximity messages between devices 102 and 140 may be based on whether device 102 is at the movement state or the non-movement state.

In one example, wireless communication unit 110 may transmit to device 140 the update message to indicate a first rate, for example, responsive to a non-movement state of device 102 and a non-movement state of device 140.

In another example, wireless communication unit 110 may transmit to device 140 the update message to indicate a second rate, for example, responsive to a movement state of at least one of devices 102 and/or 140, e.g., if device 102 is at the movement state and device 140 is at the non-movement state; if device 102 is at the non-movement state and device 140 is at the movement state; or if both devices 102 and 140 are at the movement state.

In some demonstrative embodiments, the second rate may be greater than the first rate. For example, the first rate may include a rate of exchanging, for example, two proximity messages every second; and the second rate may include a rate of exchanging, for example, thirty proximity messages every second. In other embodiments, the first and/or the second rates may include any other rates.

In some demonstrative embodiments, the update message may include a connection interval value based on the state indication of device 102 and/or device 140.

In some demonstrative embodiments, the connection interval value may indicate the rate of exchanging the proximity messages.

For example, the connection interval value may define a period of time between a first exchange of the proximity messages and a second exchange of the proximity messages between devices 102 and 140. Accordingly, increasing the value of the connection interval may result in exchanging fewer proximity messages between devices 102 and 140.

In some demonstrative embodiments, the update message may include a slave latency value, which is based on the state indication of device 102 and/or device 140.

In some demonstrative embodiments, the slave latency value may indicate the rate of exchanging the messages.

For example, the slave latency value may define a period of time in which device 140 is not to respond to read requests from device 102, e.g., a power save mode of device 140. Accordingly, increasing the value of the slave latency value may result in exchanging fewer proximity messages between devices 102 and 140, e.g., since device 140 may not respond to the read request messages during the period of time.

In one example, wireless communication units 110 and 142 may exchange the proximity messages, e.g., the ATT read request and ATT read response messages, at the second rate, for example, if at least one of devices 102 and/or 140 is moving. Wireless communication unit 142 may transmit an ATT indication message to indicate the non-movement state of device 140, e.g., upon receiving the indication of the non-movement state of device 140 from movement sensor 144. Wireless communication unit 110 may receive the ATT indication message, and may transmit to device 140 the connection update message including the connection interval value and/or the slave latency value to indicate the first rate, based on the non-movement state indication from device 140 and a non-movement indication from movement sensor 114, e.g., as described below with reference to FIG. 2.

In another example, wireless communication units 110 and 142 may exchange the proximity messages at the first rate, for example, if both of devices 102 and/or 140 are static. Wireless communication unit 142 may transmit an ATT indication message to indicate movement state of device 140, e.g., upon receiving the indication of the movement state of device 140 from movement sensor 144. Wireless communication unit 110 may receive the ATT indication message, and may transmit to device 140 the connection update message including the connection interval value and/or the slave latency value to indicate the second rate, based on the movement state indication from device 140, e.g., as described below with reference to FIG. 2.

Figure 2:
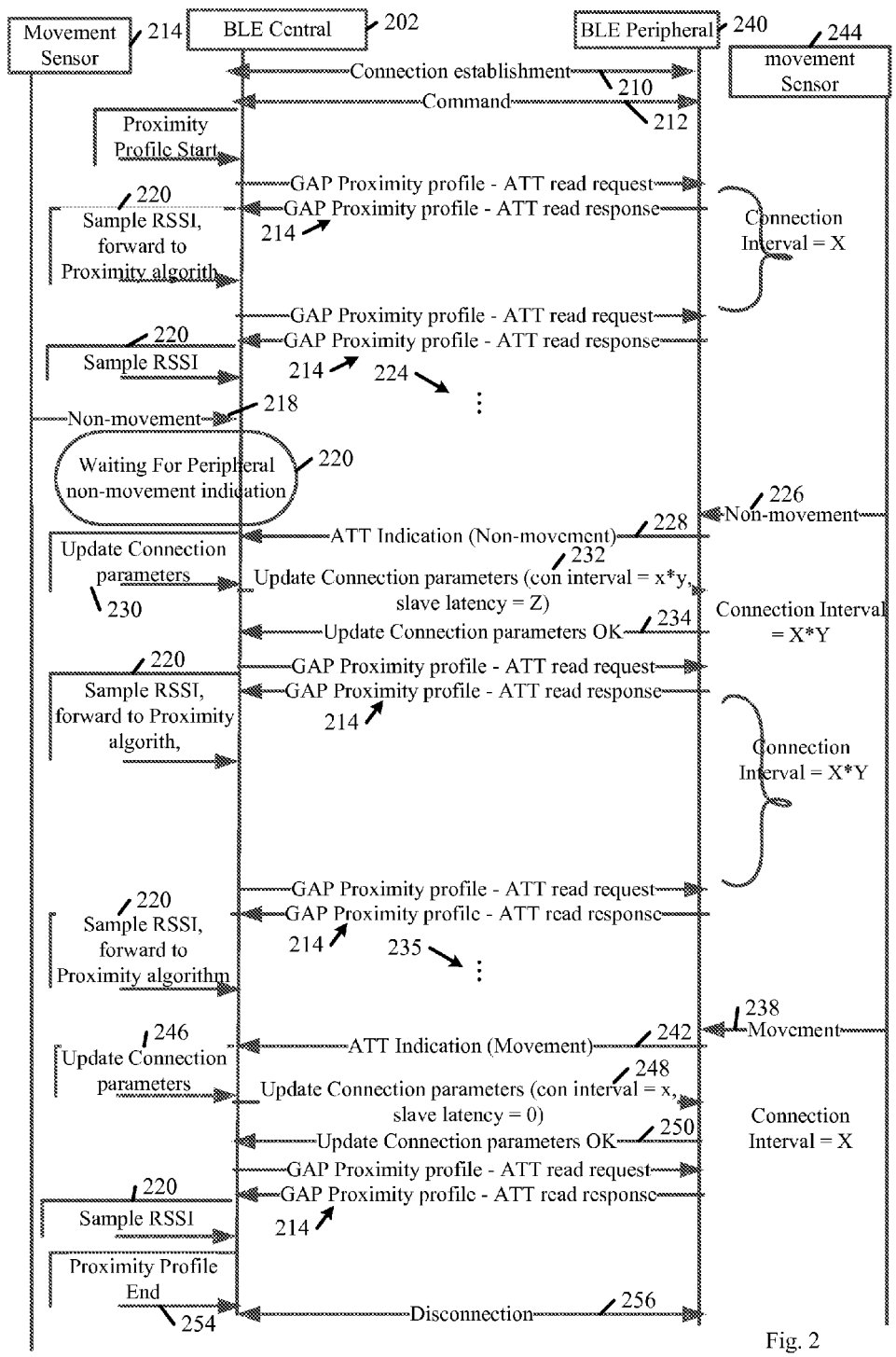
FIG. 2 is a schematic sequence diagram of operations and interactions between a central device and a peripheral device, in accordance with some demonstrative embodiments.

Reference is made to FIG. 2, which schematically illustrates a sequence diagram, which demonstrates operations and interactions between a BLE central device 202 and a BLE peripheral device 240, in accordance with some demonstrative embodiments. For example, BLE central device 202 may perform the functionality of device 102 (FIG. 1) and/or BLE peripheral device 240 may perform the functionality of device 140 (FIG. 1).

As shown in FIG. 2, device 202 and device 240 may establish a connection 210 between devices 240 and 202. For example, device 102 (FIG. 1) and device 140 (FIG. 1) may establish a BLE connection, e.g., as described above.

As shown in FIG. 2, device 202 may send to device 240 a command message 212 to indicate utilizing of movement sensors of device 202 and/or device 240 for controlling the rate of exchanging the proximity messages between devices 202 and/or 240. For example, device 102 (FIG. 1) may send command message 212 to device 140 (FIG. 1) to indicate utilizing movement sensors 114 and/or 144 (FIG. 1) for controlling the rate of exchanging the proximity messages between devices 102 and/or 140 (FIG. 1).

As shown in FIG. 2, device 202 and device 240 may exchange ATT read request and ATT read response messages 214 ("ATT proximity messages") at an increased rate, for example, a default rate. For example, device 102 (FIG. 1) and device 140 (FIG. 1) may exchange ATT proximity messages 214 at the second rate, e.g., as described above.

In some demonstrative embodiments, the rate of exchanging ATT proximity messages 214 during connection 210 may be based on a connection interval value, and a slave latency value ("the connection parameters").

In some demonstrative embodiments, the default values for the connection parameters may include the connection interval value set to a default connection interval value, denoted 'x', and the slave latency value set to zero.

As shown in FIG. 2, the connection parameters of connection 210 may remain, e.g., at the default values, for example, if at least one of devices 202 and 240 is moving.

As shown in FIG. 2, device 202 may perform a proximity measurement 220 including sampling an RSSI of the ATT read response message and determining proximity between devices 202 and 240, e.g., based on the RSSI. For example, wireless communication unit 110 (FIG. 1) may measure the RSSI of the read response message and proximity calculator 112 (FIG. 1) may determine proximity between devices 102 and/or 140 (FIG. 1) based on the RSSI, e.g., as described above.

As shown in FIG. 2, a movement sensor 214 of device 202 may indicate to device 202 a non-movement state 218 of device 204. For example, movement sensor 114 (FIG. 1) may indicate to device 102 (FIG. 1) the non-movement state of device 102 (FIG. 1), e.g., as described above.

As shown in FIG. 2, device 202 may wait (220), e.g., before making an adjustment to the rate, for an indication of non-movement from device 240. For example, device 102 (FIG. 1) may wait for the indication of the non-movement-state of device 140 (FIG. 1).

As shown in FIG. 2, device 202 and device 240 may continue (224) to exchange ATT proximity messages 214 at the increased rate, for example, as long as device 202 does not receive the indication of non-movement from device 140. For example, device 102 (FIG. 1) and device 140 (FIG. 1) may continue to exchange the messages at the first rate as long as device 102 (FIG. 1) does not receive the indication of non-movement state of device 140 (FIG. 1).

As shown in FIG. 2, a movement sensor 244 of device 240 may indicate to device 240 a non-movement state 226 of device 240. For example, movement sensor 144 (FIG. 1) may indicate to device 140 (FIG. 1) of the non-movement state of device 140 (FIG. 1), e.g., as described above.

As shown in FIG. 2, device 240 may send to device 202 an ATT indication message 228 to indicate the non-movement state 226 of device 240. For example, device 140 (FIG. 1) may send to device 102 (FIG. 1) ATT indication message 228 to indicate the non-movement state of device 140 (FIG. 1), e.g., as described above.

As shown in FIG. 2, device 202 may receive ATT indication message 228 and may perform an operation 230 of updating the connection parameters of connection 210, for example, responsive to non-movement state 226. For example, device 102 (FIG. 1) may update the rate of exchanging messages between devices 102 and 140 (FIG. 1) responsive to the non-movement state of device 140 (FIG. 1), e.g., as described above.

As shown in FIG. 2, device 202 may send to device 240 an update connection parameters message 232 to update the connection parameters of connection 210. For example, device 102 (FIG. 1) may send update connection parameters message 232 to device 140 (FIG. 1), e.g., as described above.

As shown in FIG. 2, update connection parameters message 232 may include updated connection parameters. For example, the connection interval value 'x' may be multiplied by a value 'y', wherein y>1, and the slave latency value may be set to a value "z", wherein z>0. As a result, device 202 may decrease the rate of exchanging ATT proximity messages 214 to a reduced rate.

As shown in FIG. 2, device 240 may send to device 202 an update connection parameters acknowledge (OK) message 234 to confirm receipt of update connection parameters message 232 and updating the connection parameters of connection 210. For example, device 140 (FIG. 1) may send to device 102 (FIG. 1) update connection parameters OK message 234 to confirm receipt of the update message.

As shown in FIG. 2, device 202 and device 240 may continue (235) to exchange ATT proximity messages 214 and to perform proximity measurement 220 on each ATT proximity message 214 at the reduced, for example, as long as devices 202 and 240 are static. For example, device 102 (FIG. 1) and device 140 (FIG. 1) may continue to exchange ATT proximity messages 214 at the first rate and to perform proximity measurements 220, e.g., as long as devices 102 and 140 (FIG. 1) are static, e.g., as described above.

As shown in FIG. 2, movement sensor 244 of device 240 may indicate to device 240 the movement state 238 of device 240. For example, movement sensor 144 (FIG. 1) may indicate to device 140 (FIG. 1) the movement state 238 of device 140 (FIG. 1), e.g., as described above.

As shown in FIG. 2, device 240 may send to device 202 an ATT indication message 242 to indicate device 240 is at the movement state 238. For example, device 140 (FIG. 1) may send to device 102 (FIG. 1) ATT indication message 242 to indicate device 140 (FIG. 1) is at movement state 238, e.g., as described above.

As shown in FIG. 2, device 202 may receive ATT indication message 242 and may perform an operation 246 of updating the connection parameters of connection 210, for example, based on movement state 238. For example, device 102 (FIG. 1) may update the rate of exchanging messages between devices 102 and 140 (FIG. 1) based on movement state 238 of device 140 (FIG. 1), e.g., as described above.

As shown in FIG. 2, device 202 may send to device 240 an update connection parameters message 248 to update the connection parameters of connection 210. For example, device 102 (FIG. 1) may send update connection parameters message 248 to device 140 (FIG. 1), e.g., as described above.

As shown in FIG. 2, update connection parameters message 248 may include the previous connection parameters corresponding to the increased rate. For example, the connection interval value may be set to the default value 'x' and the slave latency value may be set to zero. As a result, device 202 may increase the rate of exchanging ATT proximity messages 214, e.g., returning to the increased rate.

As shown in FIG. 2, device 240 may send to device 202 an update connection parameters OK message 250 to confirm receipt of update connection parameters message 248 and updating the connection parameters of connection 210. For example, device 140 (FIG. 1) may send update connection parameters OK message 250 to device 102 (FIG. 1).

As shown in FIG. 2, device 202 and device 240 may continue (252) to exchange ATT proximity messages 214 and to perform proximity measurement 220 at the first rate, for example, as long as at least one of devices 240 and 202 is moving. For example, device 102 (FIG. 1) and device 140 (FIG. 1) may continue to exchange ATT proximity messages 214 at the first rate and to perform proximity measurements 220 as long as at least one of devices 140 and 102 (FIG. 1) is moving, e.g., as described above.

As shown in FIG. 2, device 202 may end (254) performing proximity measurements 220 between devices 202 and 240. For example, device 102 (FIG. 1) may end the proximity measurements 220 between device 102 (FIG. 1) and device 140 (FIG. 1).

As shown in FIG. 2, device 202 and device 240 may close connection 210 and disconnect (256) from each other. For example, device 102 (FIG. 1) and device 140 (FIG. 1) may disconnect from each other.

Figure 3:
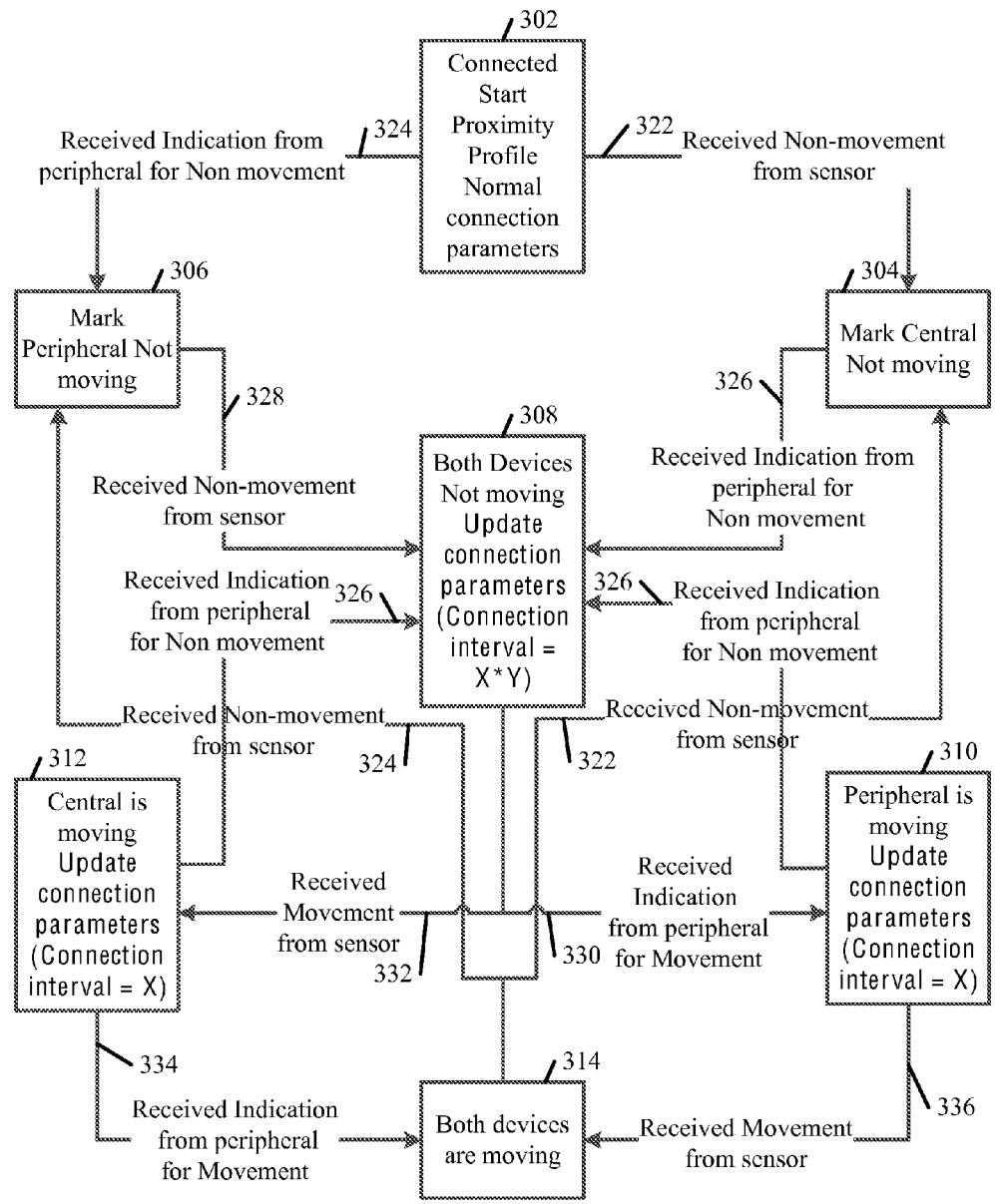
FIG. 3 is a schematic state diagram of states and operations of a central device, in accordance with some demonstrative embodiments.

Reference is made to FIG. 3, which schematically illustrates a state diagram illustrating states and operations of a BLE central device, in accordance with some demonstrative embodiments. For example, the BLE central device may perform the functionality of device 102 (FIG. 1) and/or device 202 (FIG. 2).

As shown in FIG. 3, the central device may be in a start state 302, at which the central device is connected to a peripheral device. For example, the peripheral device may perform the functionality of device 140 (FIG. 1) and/or device 240 (FIG. 2).

As shown in FIG. 3, the central device and the peripheral device may utilize the default connection parameters, e.g., the first rate for exchanging the proximity messages.

As shown in FIG. 3, the central device may transition to a state 304, at which the central device is not moving, e.g., upon receiving a non-movement indication 322 from a movement sensor of the central device. For example, device 102 (FIG. 1) may transition to state 304, e.g., if device 102 (FIG. 1) receives a non-movement indication 322 from movement sensor 114 (FIG. 1).

As shown in FIG. 3, the central device may transition to a state 306, at which the peripheral device is not moving, e.g., upon receiving a non-movement indication 324 from the peripheral device. For example, device 102 (FIG. 1) may transition to state 306, at which device 140 (FIG. 1) is not moving, e.g., if device 102 (FIG. 1) receives non-movement indication 324 from device 140 (FIG. 1).

As shown in FIG. 3, the central device may transition to a state 308, at which both the peripheral device and the central device are not moving, e.g., upon receiving a non-movement indication 326 from the peripheral device and a non-movement indication 328 from the movement sensor of the central device. For example, device 102 (FIG. 1) may transition to state 308, at which both device 140 (FIG. 1) and device 102 (FIG. 1) are not moving, e.g., if device 102 (FIG. 1) receives non-movement indication 326 from device 140 (FIG. 1) and non-movement indication 328 from movement sensor 114 (FIG. 1) indicating the non-movement state of device 102 (FIG. 1.

As shown in FIG. 3, at state 308 the central device may update the connection parameters to define a second rate of exchanging the proximity messages, e.g., by multiplying the connection interval value 'x' by the value 'y'.

As shown in FIG. 3, the central device may transition to a state 310, at which the peripheral device is moving, e.g., upon receiving a movement indication 330 from the peripheral device. For example, device 102 (FIG. 1) may transition to state 310, at which device 140 (FIG. 1) is moving, e.g., if device 102 (FIG. 1) receives movement indication 330 from device 140 (FIG. 1).

As shown in FIG. 3, at state 310 the central device may update the connection parameters to the first rate, e.g., by setting the connection interval to the value 'x'. For example, device 102 (FIG. 1) may send to device 140 (FIG. 1) the update message including the value 'x'.

As shown in FIG. 3, the central device may transition to a state 312, at which the central device is moving, e.g., upon receiving a movement indication 332 from the movement sensor of the central device. For example, device 102 (FIG. 1) may transition to state 312, at which device 102 (FIG. 1) is moving, e.g., if device 102 (FIG. 1) receives movement indication 332 from movement sensor 114 (FIG. 1).

As shown in FIG. 3, during state 312 the central device may update the connection parameters to the increased rate, e.g., by setting the connection interval to the value 'x'. For example, device 102 (FIG. 1) may send to device 140 (FIG. 1) the update message including the connection interval value 'x', e.g., as described above.

As shown in FIG. 3, the central device may transition to a state 314, at which both the peripheral device and the central device are moving, e.g., upon receiving a movement indication 334 from peripheral device and a movement indication 336 from the movement sensor of the central device. For example, device 102 (FIG. 1) may transition to state 314, at which both device 140 (FIG. 1) and device 102 (FIG. 1) are moving, e.g., if device 102 (FIG. 1) receives movement indication 334 from device 140 (FIG. 1) and movement indication 336 from movement sensor 114 (FIG. 1).

As shown in FIG. 3, at state 314 the rate of exchanging the proximity messages may remain, e.g., the same rate as at states 310 and/or 312. For example, device 102 (FIG. 1) may not send to device 140 (FIG. 1) the update message, for example, if one of devices 102 and 140 (FIG. 1) is moving and the other one is starting to move.

In other embodiments, different rates may be used for the different states. For example, a first rate may be used when both the central and peripheral devices are moving, a second rate may be used when the central device is moving, a third rate may be used when the peripheral device is moving, and/or a fourth rate may be used when both devices are not moving.

In some demonstrative embodiments, the rate may be adjusted based on a speed of the movement of the peripheral device and/or central device. For example, the rate may be increased as the speed of movement increases and decreased as the speed of movement decreases.

Figure 4:
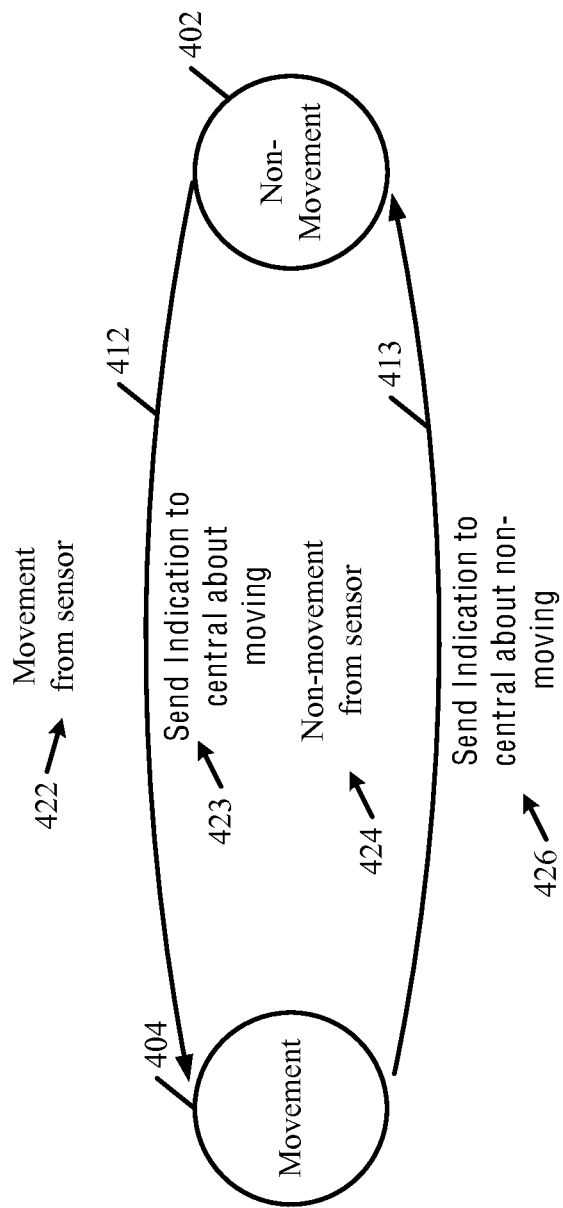
FIG. 4 is a schematic state diagram of states and operations of a peripheral device, in accordance with some demonstrative embodiments.

Reference is made to FIG. 4, which schematically illustrates a state diagram illustrating states and operations of a BLE peripheral device, in accordance with some demonstrative embodiments. For example, the BLE peripheral device may perform the functionality of device 140 (FIG. 1) and/or device 240 (FIG. 2)

As shown in FIG. 4, the peripheral device may be at a non-movement state 402, at which the peripheral device is not moving. For example, device 140 (FIG. 1) may be at non-movement state 402, for example, if movement sensor 144 (FIG. 1) indicates the non-movement state of device 140 (FIG. 1), e.g., as described above.

As shown in FIG. 4, the peripheral device may transition (412) to a state 404, at which the peripheral device is moving, e.g., if receiving a movement indication 422 from the movement sensor of the peripheral device. For example, device 140 (FIG. 1) may transition to state 404, at which device 140 (FIG. 1) is moving, e.g., if device 140 (FIG. 1) receives movement indication 422 from movement sensor 144 (FIG. 1).

As shown in FIG. 4, upon the transition to state 404 the peripheral device may send an indication 423 to a central device indicating that the peripheral device is moving. For example, device 140 (FIG. 1) may send indication 423 to device 102 (FIG. 1).

As shown in FIG. 4, the peripheral device may transition (413) to non-movement state 402, e.g., upon receiving a non-movement indication 424 from the movement sensor of the peripheral device. For example, device 140 (FIG. 1) may transition to state 402, e.g., if device 140 (FIG. 1) receives non-movement indication 424 from movement sensor 144 (FIG. 1).

As shown in FIG. 4, upon the transition from movement state 404 to non-movement state 402 the peripheral device may send an indication 426 to the central device indicating that the peripheral device is not moving. For example, device 140 (FIG. 1) may send indication 426 to device 102 (FIG. 1).

Figure 5:
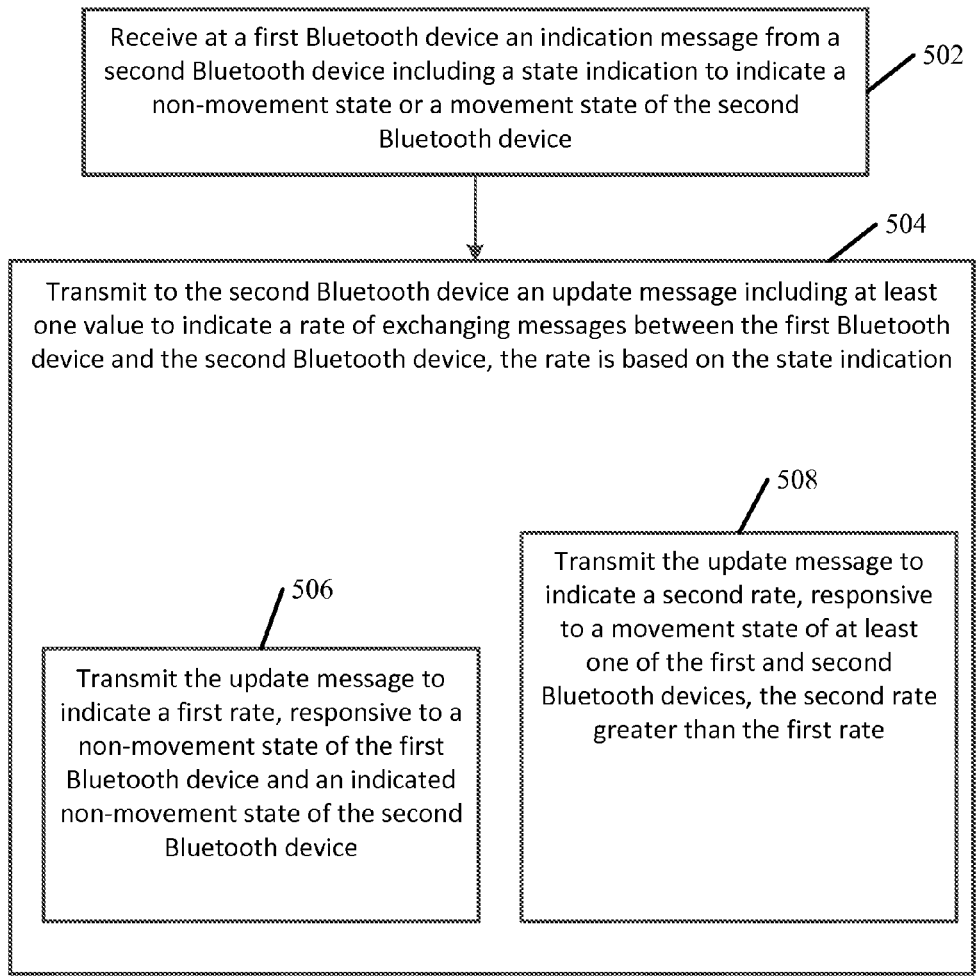
FIG. 5 is a schematic flow chart illustration of a method of Bluetooth communication, in accordance with some demonstrative embodiments.

Reference is now made to FIG. 5, which schematically illustrates a method of Bluetooth communication, in accordance with some demonstrative embodiments. For example, one or more of the operations of the method of FIG. 5 may be performed by a wireless communication system, e.g., system 100 (FIG. 1); a wireless communication device, e.g., device 140 (FIG. 1) and/or device 102 (FIG. 1), and/or a wireless communication unit, e.g., wireless communication unit 110 and/or wireless communication unit 142 (FIG. 1).

As indicated at block 502, the method may include receiving at a first Bluetooth device an indication message from a second Bluetooth device including a state indication to indicate a non-movement state or a movement state of the second Bluetooth device. For example, device 102 (FIG. 1) may receive from device 140 (FIG. 1) the indication message including the state indicator to indicate the non-movement state or the movement state of device 140 (FIG. 1), e.g., as described above.

As indicated at block 504, the method may include transmitting to the second Bluetooth device an update message including at least one value to indicate a rate of exchanging messages between the first and the second Bluetooth devices.

The rate may be based on the state indication. For example, device 102 (FIG. 1) may transmit to device 140 (FIG. 1) the ATT update message indicating the rate of exchanging the proximity messages between device 102 and 140 (FIG. 1), based on the state indication, e.g., as described above.

As indicated at block 506, transmitting the update message to the second Bluetooth device may include transmitting the update message to indicate a first rate, responsive to a non-movement state of the first Bluetooth device and an indicated non-movement state of the second Bluetooth device. For example, device 102 (FIG. 1) may transmit to device 140 (FIG. 1) the update message to indicate the first rate of exchanging messages between device 102 and 140 (FIG. 1) responsive to the non-movement state of device 102 (FIG. 1) and the indicated non-movement state of device 140 (FIG. 1), e.g., as described above.

As indicated at block 508, transmitting the update message to the second Bluetooth device may include transmitting the update message to indicate a second rate, responsive to a movement state of at least one of the first and second Bluetooth devices, the second rate greater than the first rate. For example, device 102 (FIG. 1) may transmit to device 140 (FIG. 1) the update message to indicate the second rate of exchanging messages between device 102 and 140 (FIG. 1) responsive to the movement state of at least one of devices 102 and 140 (FIG. 1), e.g., as described above.

Figure 6:
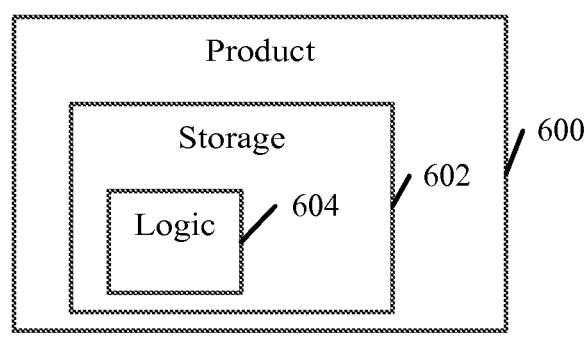
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of device 102 (FIG. 1), wireless communication unit 110 (FIG. 1), wireless communication unit 142 (FIG. 1), device 140 (FIG. 1), and/or to perform one or more operations of the method of FIGS. 3 and/or 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of wireless communication, the apparatus comprising a wireless communication unit to receive at a first Bluetooth device an indication message from a second Bluetooth device, the indication message including a state indication to indicate a non-movement state or a movement state of the second Bluetooth device, the wireless communication unit to transmit to the second Bluetooth device an update message including at least one value to indicate a rate of exchanging messages between the first and second Bluetooth devices, the rate being based on the state indication.

Example 2 includes the subject matter of Example 1, and optionally, wherein the rate is also based on whether the first Bluetooth device is at the movement state or the non-movement state.

Example 3 includes the subject matter of Example 2, and optionally, wherein the rate is a first rate when both of the first Bluetooth device and the second Bluetooth device are in a non-movement state, and wherein the rate is a second rate greater than the first rate when at least one of the first Bluetooth device or the second Bluetooth device are in a movement state.

Example 4 includes the subject matter of Example 2 or 3, and optionally, comprising a movement sensor to sense movement of the first Bluetooth device.

Example 5 includes the subject matter of any one of Examples 1-4, and optionally, wherein the update message includes a connection interval value, which is based on the state indication.

Example 6 includes the subject matter of Example 5, and optionally, wherein the connection interval value is a first connection interval value when both of the first Bluetooth device and the second Bluetooth device are in a non-movement state, and wherein the connection interval value is a second connection interval value greater than the first connection interval value when at least one of the first Bluetooth device or the second Bluetooth device are in a movement state.

Example 7 includes the subject matter of any one of Examples 1-6, and optionally, wherein the update message includes a slave latency value, which is based on the state indication.

Example 8 includes the subject matter of Example 7, and optionally, wherein the slave latency value is a first slave latency value when both of the first Bluetooth device and the second Bluetooth device are in a non-movement state, and wherein the slave latency value is a second slave latency value greater than the first slave latency value when at least one of the first Bluetooth device or the second Bluetooth device are in a movement state.

Example 9 includes the subject matter of any one of Examples 1-8, and optionally, wherein the rate is a rate of exchanging read request and read response messages between the first and second Bluetooth devices.

Example 10 includes the subject matter of any one of Examples 1-9, and optionally, wherein the rate is a rate of exchanging messages of a proximity measurement.

Example 11 includes the subject matter of any one of Examples 1-10, and optionally, wherein the indication message comprises an Attribute protocol (ATT) indication message.

Example 12 includes the subject matter of any one of Examples 1-11, and optionally, wherein the update message comprises a connection update message.

Example 13 includes the subject matter of any one of Examples 1-12, and optionally, wherein the first Bluetooth device comprises Bluetooth Low Energy (BLE) central device.

Example 14 includes a system of wireless communication, the system comprising a first Bluetooth device including a processor; a memory; at least one antenna; and a wireless communication unit to exchange messages with a second Bluetooth device, the wireless communication unit to communicate between the first and second Bluetooth devices an indication message including a state indication to indicate a non-movement state or a movement state of one of the first and second Bluetooth devices, and to communicate between the first and second Bluetooth devices an update message including at least one value to indicate a rate of exchanging the messages between the first and second Bluetooth devices, the rate being based on the state indication.

Example 15 includes the subject matter of Example 14, and optionally, wherein the wireless communication unit is to transmit the indication message including a state indication to indicate a non-movement state or a movement state of the first Bluetooth device, and to receive the update message.

Example 16 includes the subject matter of Example 14, and optionally, wherein the wireless communication unit is to receive the indication message including a state indication to indicate a non-movement state or a movement state of the second Bluetooth device, and to transmit the update message.

Example 17 includes the subject matter of Example 16, and optionally, wherein the rate is also based on whether the first Bluetooth device is at the movement state or the non-movement state.

Example 18 includes the subject matter of Example 17, and optionally, wherein the rate is a first rate when both of the first Bluetooth device and the second Bluetooth device are in a non-movement state, and wherein the rate is a second rate greater than the first rate when at least one of the first Bluetooth device or the second Bluetooth device are in a movement state.

Example 19 includes the subject matter of any one of Examples 16-18, and optionally, wherein the first Bluetooth device comprises a movement sensor to sense movement of the first Bluetooth device.

Example 20 includes the subject matter of any one of Examples 14-19, and optionally, wherein the update message includes a connection interval value, which is based on the state indication.

Example 21 includes the subject matter of any one of Examples 14-20, and optionally, wherein the update message includes a slave latency value, which is based on the state indication.

Example 22 includes the subject matter of any one of Examples 14-21, and optionally, wherein the rate is a rate of exchanging read request and read response messages between the first and second Bluetooth devices Example 23 includes the subject matter of any one of Examples 14-22, and optionally, wherein the rate is a rate of exchanging messages of a proximity measurement.

Example 24 includes the subject matter of any one of Examples 14-23, and optionally, wherein the indication message comprises an Attribute protocol (ATT) indication message.

Example 25 includes the subject matter of any one of Examples 14-24, and optionally, wherein the update message comprises a connection update message.

Example 26 includes a method of wireless communication performed by a first Bluetooth device, the method comprising exchanging messages with a second Bluetooth device; communicating with the second Bluetooth device an indication message including a state indication to indicate a non-movement state or a movement state of one of the first and second Bluetooth devices; and communicating with the second Bluetooth device an update message including at least one value to indicate a rate of exchanging the messages between the first and second Bluetooth devices, the rate being based on the state indication.

Example 27 includes the subject matter of Example 26, and optionally, wherein communicating the indication message comprises transmitting the indication message to the second Bluetooth device, the indication message including a state indication to indicate a non-movement state or a movement state of the first Bluetooth device, and wherein communicating the update message comprises receiving the update message from the second Bluetooth device.

Example 28 includes the subject matter of Example 26, and optionally, wherein communicating the indication message comprises receiving the indication message from the second Bluetooth device, the indication message including a state indication to indicate a non-movement state or a movement state of the second Bluetooth device, and wherein communicating the update message comprises transmitting the update message to the second Bluetooth device.

Example 29 includes the subject matter of Example 28, and optionally, wherein the rate is also based on whether the first Bluetooth device is at the movement state or the non-movement state.

Example 30 includes the subject matter of Example 29, and optionally, wherein the rate is a first rate when both of the first Bluetooth device and the second Bluetooth device are in a non-movement state, and wherein the rate is a second rate greater than the first rate when at least one of the first Bluetooth device or the second Bluetooth device are in a movement state.

Example 31 includes the subject matter of any one of Examples 28-30, and optionally, comprising sensing movement of the first Bluetooth device.

Example 32 includes the subject matter of any one of Examples 26-31, and optionally, wherein the update message includes a connection interval value, which is based on the state indication.

Example 33 includes the subject matter of any one of Examples 26-32, and optionally, wherein the update message includes a slave latency value, which is based on the state indication.

Example 34 includes the subject matter of any one of Examples 26-33, and optionally, wherein the rate is a rate of exchanging read request and read response messages between the first and second Bluetooth devices.

Example 35 includes the subject matter of any one of Examples 26-34, and optionally, wherein the rate is a rate of exchanging messages of a proximity measurement.

Example 36 includes the subject matter of any one of Examples 26-35, and optionally, wherein the indication message comprises an Attribute protocol (ATT) indication message.

Example 37 includes the subject matter of any one of Examples 26-36, and optionally, wherein the update message comprises a connection update message.

Example 38 includes a product including a non-transitory storage medium having stored thereon instructions that, when executed by a machine, result in at a first Bluetooth device, exchanging messages with a second Bluetooth device; at the first Bluetooth device, communicating with the second Bluetooth device an indication message including a state indication to indicate a non-movement state or a movement state of one of the first and second Bluetooth devices; and at the first Bluetooth device, communicating with the second Bluetooth device an update message including at least one value to indicate a rate of exchanging the messages between the first and second Bluetooth devices, the rate being based on the state indication.

Example 39 includes the subject matter of Example 38, and optionally, wherein communicating the indication message comprises transmitting the indication message to the second Bluetooth device, the indication message including a state indication to indicate a non-movement state or a movement state of the first Bluetooth device, and wherein communicating the update message comprises receiving the update message from the second Bluetooth device.

Example 40 includes the subject matter of Example 38, and optionally, wherein communicating the indication message comprises receiving the indication message from the second Bluetooth device, the indication message including a state indication to indicate a non-movement state or a movement state of the second Bluetooth device, and wherein communicating the update message comprises transmitting the update message to the second Bluetooth device.

Example 41 includes the subject matter of Example 40, and optionally, wherein the rate is also based on whether the first Bluetooth device is at the movement state or the non-movement state.

Example 42 includes the subject matter of Example 41, and optionally, wherein the rate is a first rate when both of the first Bluetooth device and the second Bluetooth device are in a non-movement state, and wherein the rate is a second rate greater than the first rate when at least one of the first Bluetooth device or the second Bluetooth device are in a movement state.

Example 43 includes the subject matter of any one of Examples 40-42, and optionally, wherein the instructions result in sensing movement of the first Bluetooth device.

Example 44 includes the subject matter of any one of Examples 38-43, and optionally, wherein the update message includes a connection interval value, which is based on the state indication.

Example 45 includes the subject matter of any one of Examples 38-44, and optionally, wherein the update message includes a slave latency value, which is based on the state indication.

Example 46 includes the subject matter of any one of Examples 38-45, and optionally, wherein the rate is a rate of exchanging read request and read response messages between the first and second Bluetooth devices.

Example 47 includes the subject matter of any one of Examples 38-46, and optionally, wherein the rate is a rate of exchanging messages of a proximity measurement.

Example 48 includes the subject matter of any one of Examples 38-47, and optionally, wherein the indication message comprises an Attribute protocol (ATT) indication message.

Example 49 includes the subject matter of any one of Examples 38-48, and optionally, wherein the update message comprises a connection update message.

Example 50 includes an apparatus of wireless communication, the apparatus comprising means for exchanging, at a first Bluetooth device, messages with a second Bluetooth device; means for communicating with the second Bluetooth device an indication message including a state indication to indicate a non-movement state or a movement state of one of the first and second Bluetooth devices; and means for communicating with the second Bluetooth device an update message including at least one value to indicate a rate of exchanging the messages between the first and second Bluetooth devices, the rate being based on the state indication.

Example 51 includes the subject matter of Example 50, and optionally, comprising means for transmitting the indication message to the second Bluetooth device, the indication message including a state indication to indicate a non-movement state or a movement state of the first Bluetooth device; and means for receiving the update message from the second Bluetooth device.

Example 52 includes the subject matter of Example 50, and optionally, comprising means for receiving the indication message from the second Bluetooth device, the indication message including a state indication to indicate a non-movement state or a movement state of the second Bluetooth device; and means for transmitting the update message to the second Bluetooth device.

Example 53 includes the subject matter of Example 52, and optionally, wherein the rate is also based on whether the first Bluetooth device is at the movement state or the non-movement state.

Example 54 includes the subject matter of Example 53, and optionally, wherein the rate is a first rate when both of the first Bluetooth device and the second Bluetooth device are in a non-movement state, and wherein the rate is a second rate greater than the first rate when at least one of the first Bluetooth device or the second Bluetooth device are in a movement state.

Example 55 includes the subject matter of any one of Examples 52-54, and optionally, comprising means for sensing movement of the first Bluetooth device.

Example 56 includes the subject matter of any one of Examples 50-55, and optionally, wherein the update message includes a connection interval value, which is based on the state indication.

Example 57 includes the subject matter of any one of Examples 50-56, and optionally, wherein the update message includes a slave latency value, which is based on the state indication.

Example 58 includes the subject matter of any one of Examples 50-57, and optionally, wherein the rate is a rate of exchanging read request and read response messages between the first and second Bluetooth devices.

Example 59 includes the subject matter of any one of Examples 50-58, and optionally, wherein the rate is a rate of exchanging messages of a proximity measurement.

Example 60 includes the subject matter of any one of Examples 50-59, and optionally, wherein the indication message comprises an Attribute protocol (ATT) indication message.

Example 61 includes the subject matter of any one of Examples 50-60, and optionally, wherein the update message comprises a connection update message.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
    a wireless communication unit to receive at a first Bluetooth device an indication message from a second Bluetooth device, the indication message including a state indication to indicate a non-movement state or a movement state of said second Bluetooth device, said wireless communication unit to transmit to said second Bluetooth device an update message including at least one value to indicate a rate of exchanging messages between said first and second Bluetooth devices, said rate being based on the state indication, the update message comprises a connection update message.

2. The apparatus of claim 1, wherein said rate is also based on whether said first Bluetooth device is at the movement state or the non-movement state.

3. The apparatus of claim 2, wherein said rate is a first rate when both of said first Bluetooth device and said second Bluetooth device are in a non-movement state, and wherein said rate is a second rate greater than said first rate when at least one of the first Bluetooth device or the second Bluetooth device are in a movement state.

4. The apparatus of claim 2 comprising a movement sensor to sense movement of said first Bluetooth device.

5. The apparatus of claim 1, wherein said rate is a rate of exchanging messages of a proximity measurement.

6. An apparatus comprising:
    a wireless communication unit to receive at a first Bluetooth device an indication message from a second Bluetooth device, the indication message including a state indication to indicate a non-movement state or a movement state of said second Bluetooth device, said wireless communication unit to transmit to said second Bluetooth device an update message including at least one value to indicate a rate of exchanging messages between said first and second Bluetooth devices, said rate being based on the state indication, the update message comprises a connection interval value, which is based on the state indication.

7. The apparatus of claim 6, wherein said connection interval value is a first connection interval value when both of said first Bluetooth device and said second Bluetooth device are in a non-movement state, and wherein said connection interval value is a second connection interval value greater than said first connection interval value when at least one of the first Bluetooth device or the second Bluetooth device are in a movement state.

8. An apparatus comprising:
    a wireless communication unit to receive at a first Bluetooth device an indication message from a second Bluetooth device, the indication message including a state indication to indicate a non-movement state or a movement state of said second Bluetooth device, said wireless communication unit to transmit to said second Bluetooth device an update message including at least one value to indicate a rate of exchanging messages between said first and second Bluetooth devices, said rate being based on the state indication, the update message comprises a slave latency value, which is based on the state indication.

9. The apparatus of claim 8, wherein said slave latency value is a first slave latency value when both of said first Bluetooth device and said second Bluetooth device are in a non-movement state, and wherein said slave latency value is a second slave latency value greater than said first slave latency value when at least one of the first Bluetooth device or the second Bluetooth device are in a movement state.

10. An apparatus comprising:
    a wireless communication unit to receive at a first Bluetooth device an indication message from a second Bluetooth device, the indication message including a state indication to indicate a non-movement state or a movement state of said second Bluetooth device, the indication message comprises an Attribute protocol (ATT) indication message, said wireless communication unit to transmit to said second Bluetooth device an update message including at least one value to indicate a rate of exchanging messages between said first and second Bluetooth devices, said rate being based on the state indication.

11. The apparatus of claim 10, wherein the update message comprises a connection update message.

12. An apparatus comprising:
    a wireless communication unit to receive at a first Bluetooth device an indication message from a second Bluetooth device, said first Bluetooth device comprises Bluetooth Low Energy (BLE) central device, the indication message including a state indication to indicate a non-movement state or a movement state of said second Bluetooth device, said wireless communication unit to transmit to said second Bluetooth device an update message including at least one value to indicate a rate of exchanging messages between said first and second Bluetooth devices, said rate being based on the state indication.

13. The apparatus of claim 12, wherein said rate is a rate of exchanging read request and read response messages between said first and second Bluetooth devices.

14. A system of wireless communication, the system comprising:
    a first Bluetooth device including:
        a processor;
        a memory;
        at least one antenna; and
        a wireless communication unit to exchange messages with a second Bluetooth device, the wireless communication unit to communicate between the first and second Bluetooth devices an indication message including a state indication to indicate a non-movement state or a movement state of one of said first and second Bluetooth devices, and to communicate between said first and second Bluetooth devices an update message including at least one value to indicate a rate of exchanging said messages between said first and second Bluetooth devices, said rate being based on the state indication, the update message comprises a connection interval value, which is based on the state indication.

15. The system of claim 14, wherein said wireless communication unit is to transmit said indication message including a state indication to indicate a non-movement state or a movement state of said first Bluetooth device, and to receive said update message.

16. The system of claim 14, wherein said wireless communication unit is to receive said indication message including a state indication to indicate a non-movement state or a movement state of said second Bluetooth device, and to transmit said update message.

17. A system of wireless communication, the system comprising:
   a first Bluetooth device including:
      a processor;
      a memory;
      at least one antenna; and
      a wireless communication unit to exchange messages with a second Bluetooth device, the wireless communication unit to communicate between the first and second Bluetooth devices an indication message including a state indication to indicate a non-movement state or a movement state of one of said first and second Bluetooth devices, and to communicate between said first and second Bluetooth devices an update message including at least one value to indicate a rate of exchanging said messages between said first and second Bluetooth devices, said rate being based on the state indication, the update message comprises a slave latency value, which is based on the state indication.

18. The system of claim 17, wherein said slave latency value is a first slave latency value when both of said first Bluetooth device and said second Bluetooth device are in a non-movement state, and wherein said slave latency value is a second slave latency value greater than said first slave latency value when at least one of the first Bluetooth device or the second Bluetooth device are in a movement state.

19. A method to be performed by a first Bluetooth device, the method comprising:
   exchanging messages with a second Bluetooth device;
   communicating with the second Bluetooth device an indication message including a state indication to indicate a non-movement state or a movement state of one of said first and second Bluetooth devices; and
   communicating with said second Bluetooth device an update message including at least one value to indicate a rate of exchanging said messages between said first and second Bluetooth devices, said rate being based on the state indication, the update message comprises a connection update message.

20. The method of claim 19, wherein communicating said indication message comprises transmitting said indication message to said second Bluetooth device, the indication message including a state indication to indicate a non-movement state or a movement state of said first Bluetooth device, and wherein communicating said update message comprises receiving said update message from said second Bluetooth device.

21. The method of claim 19, wherein communicating said indication message comprises receiving said indication message from said second Bluetooth device, the indication message including a state indication to indicate a non-movement state or a movement state of said second Bluetooth device, and wherein communicating said update message comprises transmitting said update message to said second Bluetooth device.

22. A product including a non-transitory storage medium having stored thereon instructions that, when executed by a machine, result in:
   at a first Bluetooth device, exchanging messages with a second Bluetooth device;
   at the first Bluetooth device, communicating with the second Bluetooth device an indication message including a state indication to indicate a non-movement state or a movement state of one of said first and second Bluetooth devices; and
   at the first Bluetooth device, communicating with said second Bluetooth device an update message including at least one value to indicate a rate of exchanging said messages between said first and second Bluetooth devices, said rate being based on the state indication, the update message comprises a connection update message.

23. The product of claim 22, wherein communicating said indication message comprises transmitting said indication message to said second Bluetooth device, the indication message including a state indication to indicate a non-movement state or a movement state of said first Bluetooth device, and wherein communicating said update message comprises receiving said update message from said second Bluetooth device.

24. The product of claim 22, wherein communicating said indication message comprises receiving said indication message from said second Bluetooth device, the indication message including a state indication to indicate a non-movement state or a movement state of said second Bluetooth device, and wherein communicating said update message comprises transmitting said update message to said second Bluetooth device.

25. The product of claim 24, wherein said rate is also based on whether said first Bluetooth device is at the movement state or the non-movement state.

* * * * *